(12) United States Patent (10) Patent No.: US 9,301,060 B2
Liao et al. (45) Date of Patent: Mar. 29, 2016

(54) METHOD OF PROCESSING VOICE SIGNAL OUTPUT AND EARPHONE

(71) Applicant: Kuo-Ping Yang, Taipei (TW)

(72) Inventors: Ho-Hsin Liao, Taipei (TW); Kuan-Li Chao, Taipei (TW); Neo Bob Chih-Yung Young, Taipei (TW); Kuo-Ping Yang, Taipei (TW)

(73) Assignee: UNLIMITER MFA CO., LTD., Eden Island (SC)

( * ) Notice: Subject to any disclaimer, the term of this patent is extended or adjusted under 35 U.S.C. 154(b) by 0 days.

(21) Appl. No.: 14/290,368

(22) Filed: May 29, 2014

(65) Prior Publication Data

US 2015/0281858 A1 Oct. 1, 2015

(30) Foreign Application Priority Data

Mar. 27, 2014 (TW) .............................. 103111402 A

(51) Int. Cl.
*H04B 7/00* (2006.01)
*H04M 1/00* (2006.01)
*H04R 25/00* (2006.01)
*H04M 1/60* (2006.01)
*H04M 1/725* (2006.01)

(52) U.S. Cl.
CPC ........... *H04R 25/554* (2013.01); *H04M 1/6066* (2013.01); *H04M 1/72591* (2013.01)

(58) Field of Classification Search
CPC .......... H04R 1/1083; H04R 1/22; H04R 1/32; H04R 3/002; H04R 3/005; H04R 5/04; H04R 25/554; H04M 1/6066

USPC ......... 455/41.1–41.3, 575.2, 556.1, 557, 570; 381/312, 317, 79, 337, 357

See application file for complete search history.

(56) References Cited

U.S. PATENT DOCUMENTS

| | | | |
|---|---|---|---|
| 8,355,515 B2* | 1/2013 | Mao et al. ...................... 381/74 |
| 2003/0118197 A1* | 6/2003 | Nagayasu et al. .............. 381/74 |
| 2005/0004796 A1* | 1/2005 | Trump ..................... H03G 3/32 704/225 |
| 2005/0090295 A1* | 4/2005 | Ali et al. ..................... 455/575.2 |
| 2006/0165243 A1* | 7/2006 | Lee ................................. 381/74 |
| 2008/0044036 A1* | 2/2008 | Konchitsky ................. 381/71.1 |
| 2010/0041447 A1* | 2/2010 | Graylin ..................... 455/575.2 |
| 2011/0014957 A1* | 1/2011 | Sugimori et al. .......... 455/569.1 |
| 2011/0165920 A1* | 7/2011 | Slevin ........................ 455/575.2 |
| 2012/0243691 A1* | 9/2012 | Lin ................................ 381/22 |
| 2014/0064509 A1* | 3/2014 | Su ........................ H03G 3/3089 381/73.1 |
| 2014/0273851 A1* | 9/2014 | Donaldson et al. .......... 455/41.2 |
| 2014/0321654 A1* | 10/2014 | Kim et al. ...................... 381/57 |
| 2015/0063584 A1* | 3/2015 | Krisch et al. ................ 381/71.6 |
| 2015/0110263 A1* | 4/2015 | Johnston et al. ............... 381/74 |

\* cited by examiner

*Primary Examiner* — Simon Nguyen
(74) *Attorney, Agent, or Firm* — Bacon & Thomas, PLLC

(57) ABSTRACT

A method of processing a voice output signal is applied in an earphone. The method processes the voice signal received from the earphone via a sound processing module inside the earphone such that a user can hear the voice signal more clearly. The earphone can be used as a hearing-aid when the user is not using a phone, and the earphone also can be used to help the user hear voice signals for phone communication.

4 Claims, 5 Drawing Sheets

METHOD OF PROCESSING VOICE SIGNAL OUTPUT AND EARPHONE

BACKGROUND OF THE INVENTION

1. Field of the Invention

The present invention relates to a technique for enabling hearing-impaired people to identify accurately the environment sounds and the voice signal of the other side of a conversation more clearly when they are answering the phone, wherein it comprises an earphone using the above method.

2. Description of the Related Art

The Bluetooth earphone was originally designed for use as a wireless earphone. The speaker outputs sound after receiving the sound signal of a phone or a music player (such as an iPod™). As the technology has developed, a Bluetooth earphone can used as a hearing aid (mainly for the purpose of increasing the volume) in the related art. That is, the sounds from the speaker of the Bluetooth earphone are received by the microphone of the Bluetooth earphone itself, which provides the hearing-impaired listeners another choice when they look for a hearing aid. Furthermore, the Bluetooth earphone will not appear strange to other people, so the hearing-impaired listeners can wear the earphone with confidence.

When a Bluetooth earphone is used as a hearing aid, the function thereof is to process (by increasing the volume or adjusting the frequency) the environmental sounds received by the microphone such that the hearing-impaired listeners can identify accurately the sounds. However, the environmental sounds around the hearing-impaired listeners, the voice signals of the hearing-impaired listeners, and the voice signals of the other party from the phone speaker may all be influenced simultaneously by the hearing aid if it is used in conjunction with the Bluetooth earphone. The quality of communication can be badly influenced when hearing-impaired listeners use a hearing aid with a Bluetooth earphone to communicate with other people.

Thus hearing-impaired listeners are in need of help in this regard.

SUMMARY OF THE INVENTION

The primary object of the present invention is to provide a method of voice signal output.

Another object of the present invention is to provide an earphone to achieve the above method.

To achieve the above-mentioned objects, the present invention may be processed in two ways:

The first method is a state of not using the near-end phone for communication. The earphone receives a near-end input voice signal via a microphone module, modifies the near-end input voice signal with a frequency lowering process via a sound processing module so as to generate a first output voice signal, and outputs the first output voice signal via a speaker module.

The second method is a state of using the near-end phone for communication. The near-end phone first transmits a far-end input voice signal to the earphone. The earphone then receives the far-end input voice signal of the other party via a communication module, modifies the near-end input voice signal and the far-end input voice signal with the frequency lowering process to generate a first output voice signal and a second output voice signal, and outputs the first output voice signal via a speaker module.

Furthermore, before the first output voice signal is modified with the frequency lowering process, it is first determined if the adjustment module will adjust the earphone setting to decrease (or even turn off) the volume of the first output voice signal according to the needs of the hearing-impaired listener.

The near-end input voice signal may be, for example, environmental sound and the voice of the hearing-impaired listener. The far-end voice signal may be, for example, the voice of the caller. The sound processing module of the earphone first processes the near-end and far-end input voice signals to, for example, a range below 4,000 Hz, and then outputs voice signals to the hearing-impaired listener via the speaker module. Therefore, the hearing-impaired listener is able to hear an entire voice signal, including components of the voice signal that were originally above 4,000 Hz.

According to an embodiment of the present invention, the receiver using the near-end phone is a hearing-impaired listener. Both the near-end phone and the far-end phone are telephony devices.

In addition to helping the hearing-impaired listener to identify the voice signals accurately, the present invention enables the hearing-impaired listener to decrease the influence of environmental sounds via the adjustment function when he/she answers the phone with the Bluetooth earphone.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

To clarify the above and other purposes, features, and advantages of this invention, a specific embodiment of this invention is especially listed and described in detail with the attached figures as follows.

Figure 1:
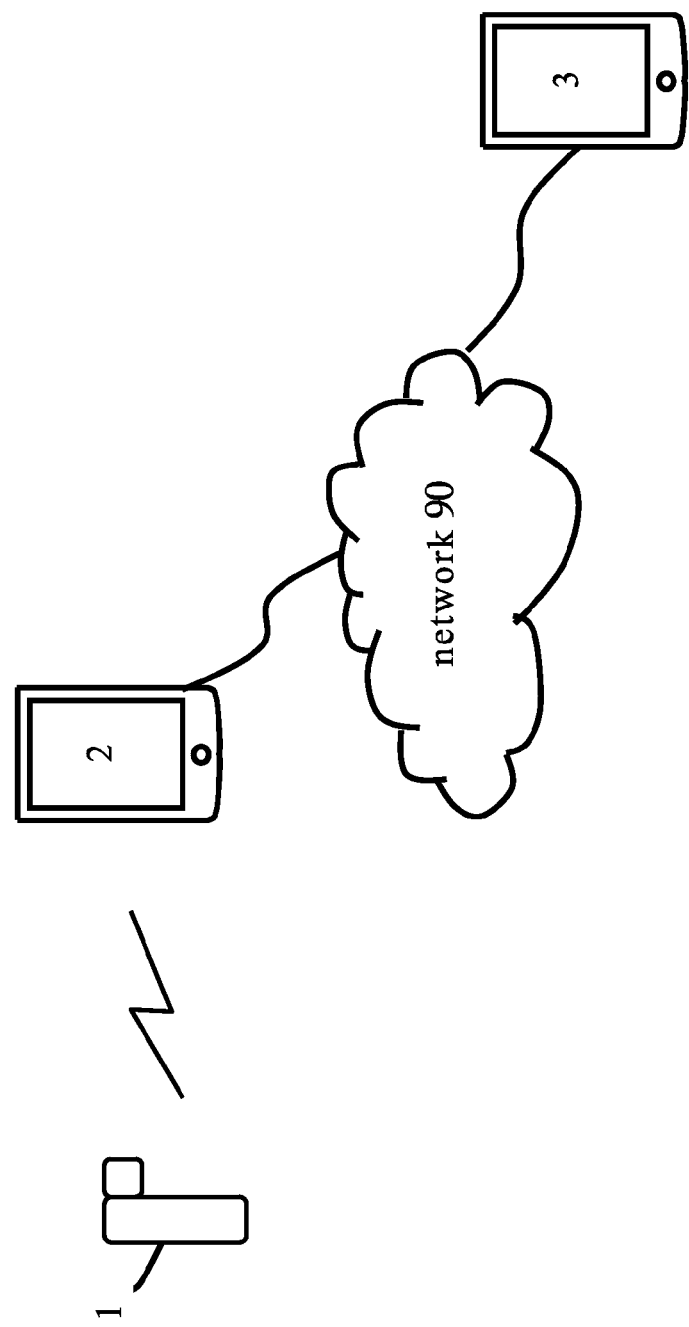
FIG. 1 is a schematic diagram of the use environment of the present invention.

FIG. 1 presents a schematic diagram of the use environment of the present invention. The earphone 1 may be electrically connected to a near-end phone 2 and the connecting ways may be wired or wireless. According to the embodiment, the voice signal is transmitted to a far-end phone 3 via a network 90 with Bluetooth.

In one embodiment of the present invention, the near-end phone 2 and far-end phone 3 may be phones or communication devices that do not remove high frequency sounds during transmission.

The network 90 may be a telecommunication network made up by a softswitch, user device, network between the softswitches and network between the user device and the softswitches. These networks may be wired or wireless (electrical wave).

Figure 2:
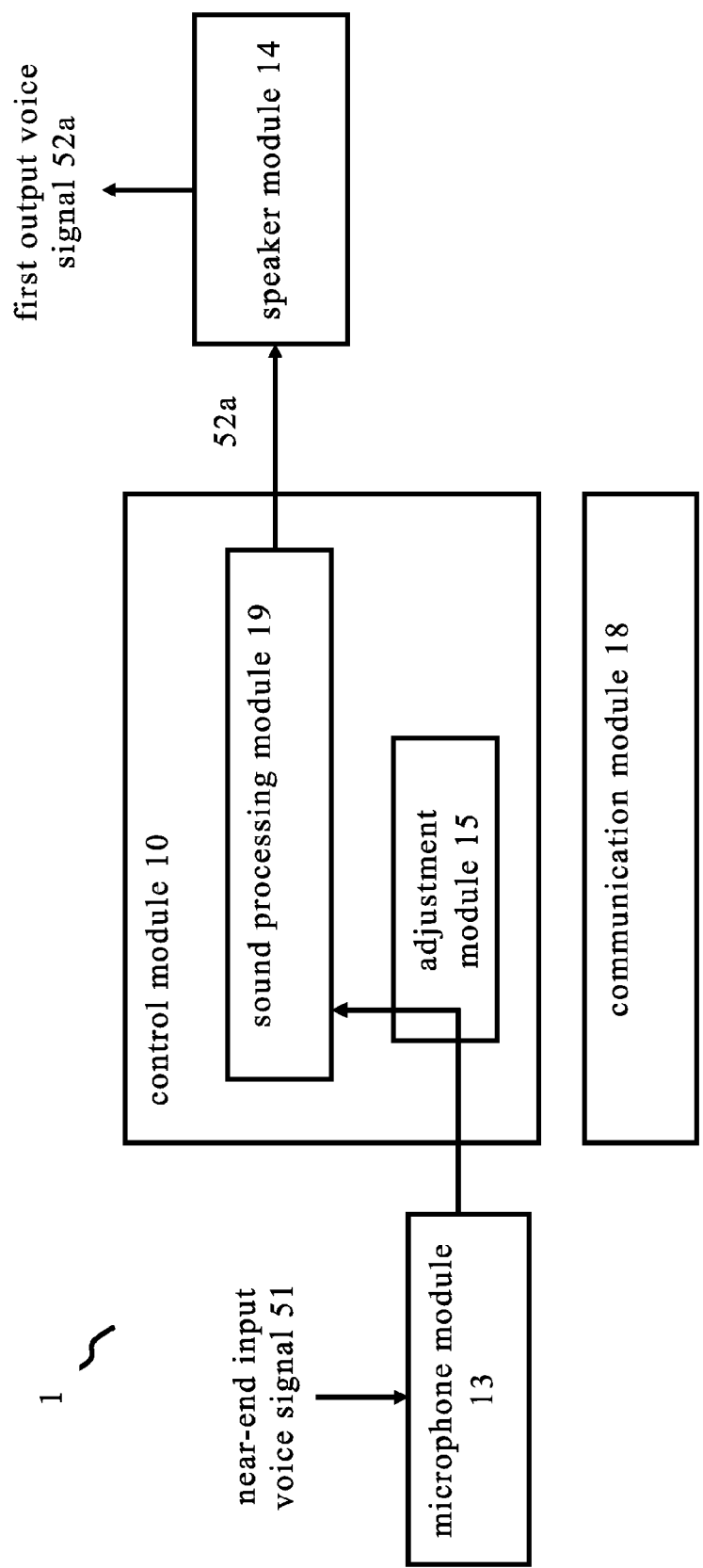
FIG. 2 is a hardware structure drawing of the earphone of the present invention illustrating a state wherein the earphone does not use the near-end phone for phone communication.
Figure 3:
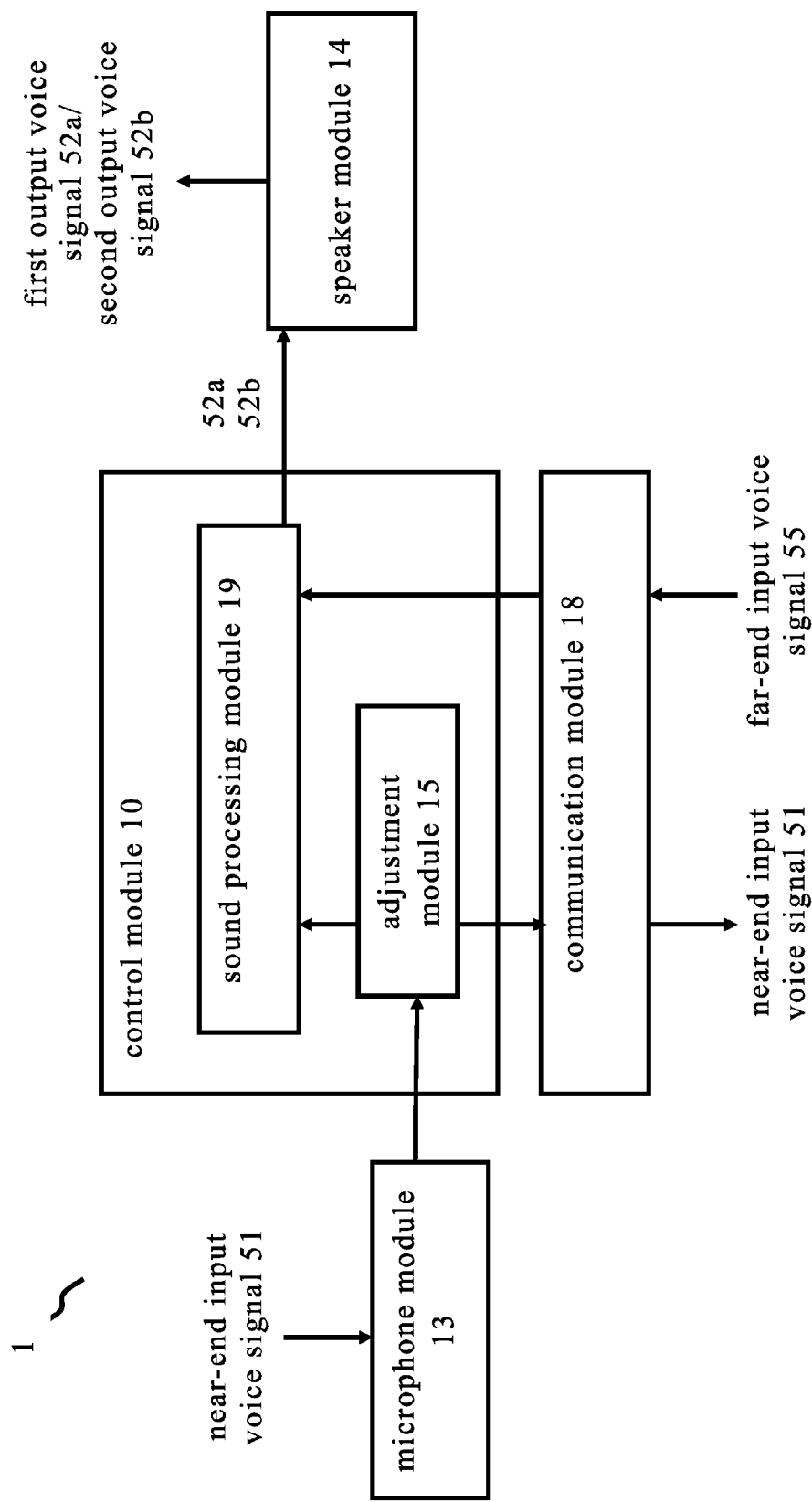
FIG. 3 is a hardware structure drawing of the earphone of the present invention illustrating a state wherein the earphone uses the near-end phone for phone communication.

Please refer to FIG. 2 and FIG. 3, both of which present the same hardware structure. FIG. 2 presents a state wherein the earphone 1 does not use the near-end phone 2 for phone communication. FIG. 3 presents a state wherein the earphone 1 uses the near-end phone 2 for phone communication. The earphone 1 includes: a control module 10, a microphone module 13, a speaker module 14, and a communication module 18. The control module 10 further includes an adjustment module 15 and a sound processing module 19. The microphone module 13, the speaker module 14, and the communication module 18 are electrically connected to the sound processing module 19.

Figure 4:
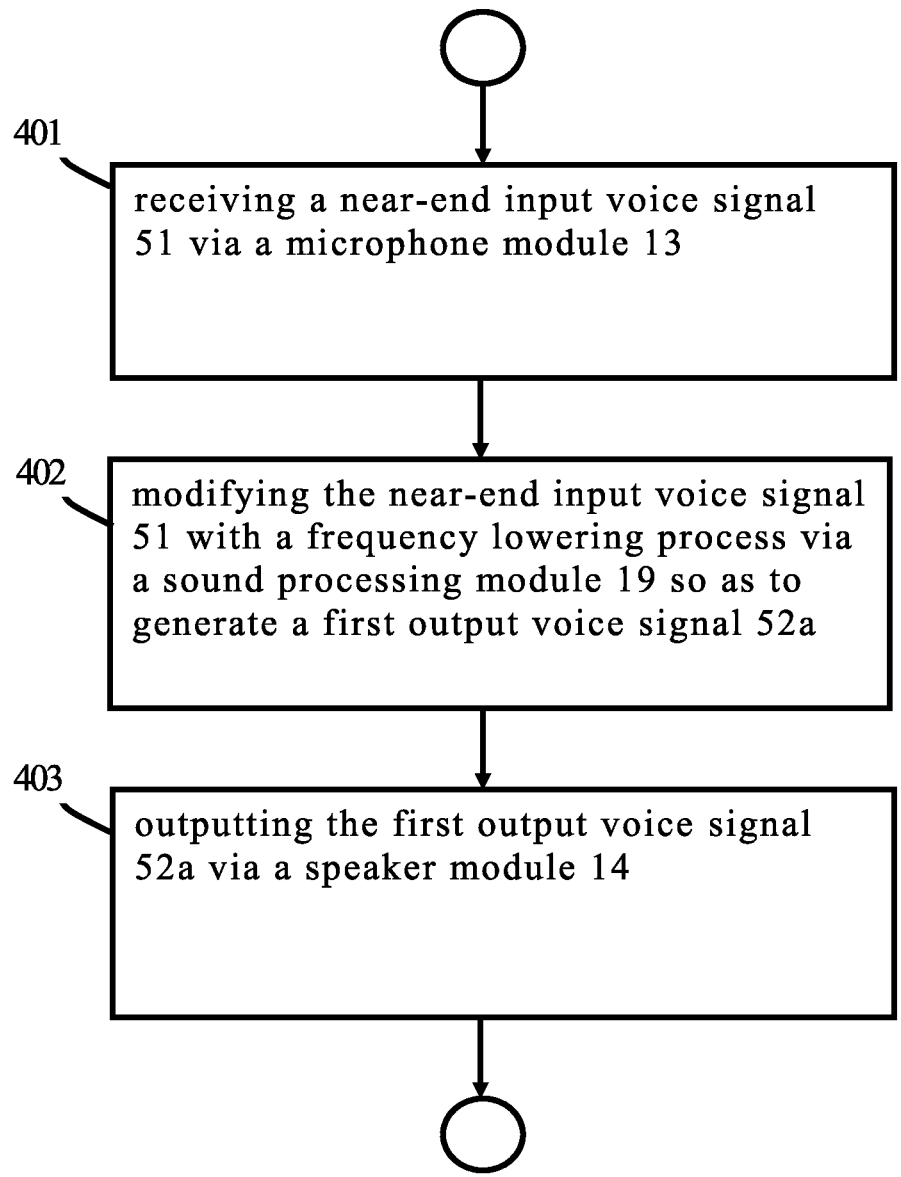
FIG. 4 is a flowchart of the present invention illustrating the steps of the process when the earphone does not use the near-end phone for phone communication.

Please refer to FIG. 4 presenting a flowchart of the present invention illustrating a state wherein the earphone 1 does not use the near-end phone 2 for phone communication. Please also refer to FIG. 1 and FIG. 2 so as to understand the present invention.

Step 401: receiving a near-end input voice signal 51 via a microphone module 13.

The near-end input voice signal 51, which may be the voice of the user or environmental sounds (including the speaking voices from others talking to the user), is received by the microphone module 13 and transmitted to the adjustment module 15 inside the control module 10 and sound processing module 19 in turn. The adjustment module 15 in the embodiment may not process the voice signal. The near-end input voice signal 51 enters the sound processing module 19 after passing the adjustment module 15, which is able to adjust the energy of the near-end input voice signal 51 according to the preference of the hearing-impaired listener.

Step 402: modifying the near-end input voice signal 51 with a frequency lowering process via a sound processing module 19 so as to generate a first output voice signal 52a;

The sound processing module 19 is used to conduct a frequency lowering process on the voice signal. The high frequency range of the first output voice signal 52a is compressed or shifted by the sound processing module 19, and then the first output voice signal 52a is generated and transmitted to the speaker module 14. This output voice signal enables the hearing-impaired listeners to hear sounds that originally were in the high frequency range (such as above 4,000 Hz). Because the method of sound compression is well known to those of reasonable skill in the art, the detailed description of the method is omitted.

Step 403: outputting the first output voice signal 52a via a speaker module 14.

After the process of the sound processing module 19, the speaker module 14 outputs the first output voice signal 52a such that hearing-impaired listeners can hear the voice accurately, which is also the fundamental principle of the hearing-aid. The speaker module 14 is used to play the first output voice signal 52a and may be, for example, a speaker, an amplifier or any device able to play sounds.

Figure 5:
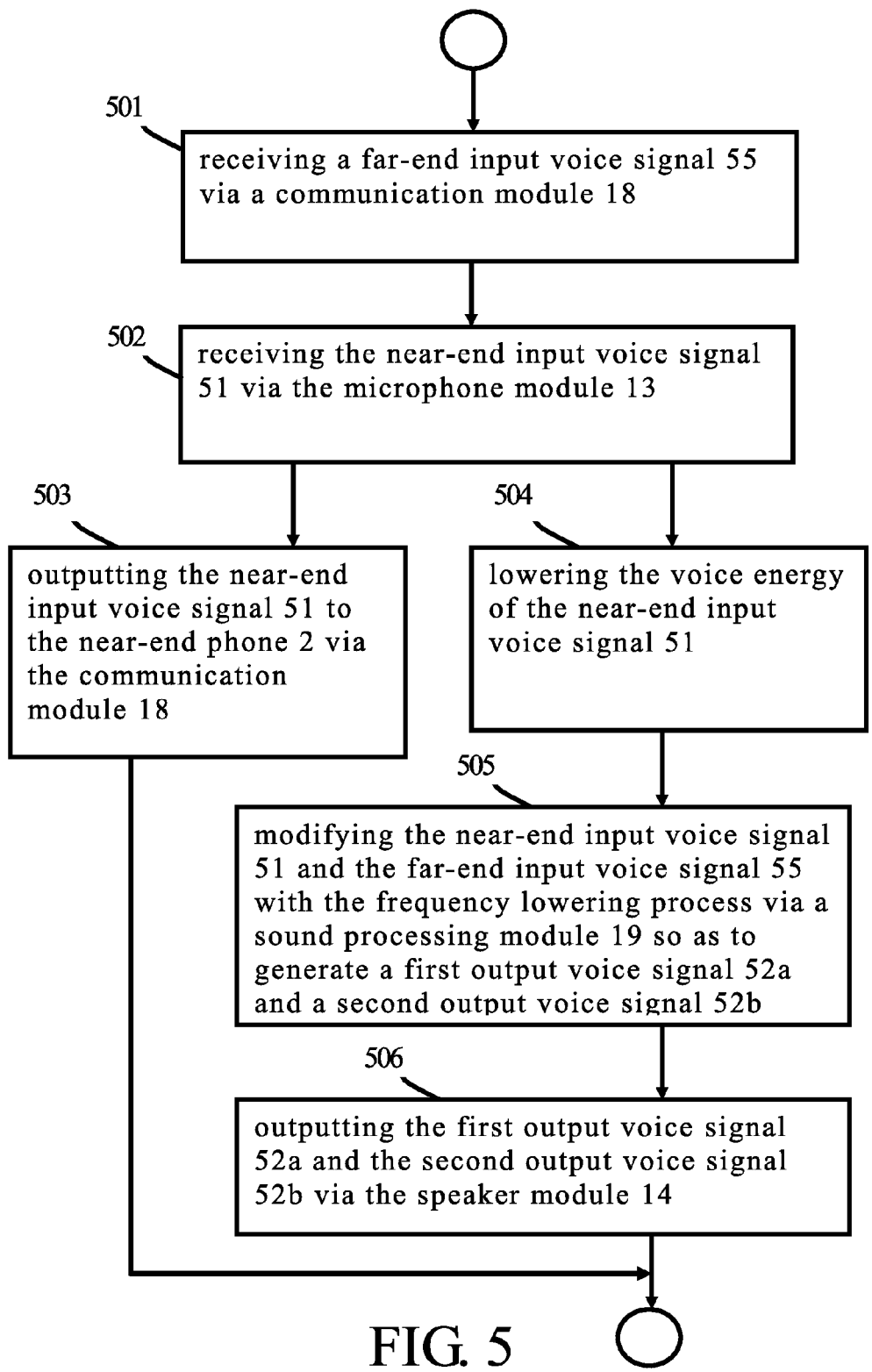
FIG. 5 is a flowchart of the present invention illustrating the steps of the process when the earphone uses the near-end phone for phone communication.

Please refer to FIG. 5, which presents a flowchart of the present invention illustrating a state wherein the earphone 1 uses the near-end phone 2 for phone communication. And please also refer to FIG. 1 and FIG. 3 so as to understand the present invention.

Step 501: receiving a far-end input voice signal 55 via a communication module 18.

The communication module 18 is used as a medium for telecommunication and may be a telephone line, the Internet or Bluetooth. According to the embodiment, the communication module 18 is a Bluetooth communication module. FIG. 1 presents that the near-end phone 2 receives the far-end input voice signal 55 from the far-end phone 3 and transmits it to the earphone 1 with Bluetooth. Then the communication module 18 of the earphone 1 receives the far-end input voice signal 55.

Step 502: receiving the near-end input voice signal 51 via the microphone module 13.

This step is the same as step 401 that the near-end phone 2 is not used for phone communication. The near-end input voice signal 51 is received by a microphone module 13 and transmitted to the adjustment module 15 of the control module 10 and the sound processing module 19 in turn.

Step 503: outputting the near-end input voice signal 51 to the near-end phone 2 via the communication module 18.

According to the embodiment, the near-end input voice signal 51 is transmitted to the near-end phone 2 via communication module 18 with Bluetooth, and to the far-end phone 3 via the network 90 such that the receiver of the far-end phone 3 receives the voice signal from the near-end phone 2.

Step 504: lowering the voice energy of the near-end input voice signal 51 (including preventing the near-end input voice signal 51 from entering the sound processing module 19).

A hearing-impaired listener may adjust the near-end input voice signal 51 to his/her preferred volume (even muted) according to the listeners needs via the function that the adjustment module 15 can adjust the energy of the voice. The hearing-impaired listener will have difficulty hearing the transmitted sounds if the near-end input voice signal 51 includes noise (like the sound of a car engine). Therefore, the hearing-impaired listener may decrease or prevent the near-end input voice signal 51 from entering the sound processing module 19 via the adjustment module 15 if he/she wants to hear the far-end input voice signal 55 more clearly.

Step 505: modifying the near-end input voice signal 51 and the far-end input voice signal 55 with the frequency lowering process via a sound processing module 19 so as to generate a first output voice signal 52a and a second output voice signal 52b.

It is better to mix the near-end input voice signal 51 and the far-end input voice signal 55 when they enter the sound processing module 19, which may modify them simultaneously. For the purpose of explaining, the specification divides the voice into the first output voice signal 52a and second output voice signal 52b, but they are actually mixed together.

When the near-end input voice signal 51 cannot enter the sound processing module 19 due to the adjustment module 15, only the second output voice signal 52b may be generated.

Step 506: outputting the first output voice signal 52a and the second output voice signal 52b via the speaker module 14.

The speaker module 14 outputs the first output voice signal 52a and second output voice signal 52b modified by the sound processing module 19 so as to enable hearing-impaired listeners to hear the voice signals accurately.

It should be noted that, although a few exemplary embodiments of the present invention have been shown and described, the present invention is not limited to the described exemplary embodiments. Instead, it will be appreciated by those skilled in the art that changes may be made to these exemplary embodiments without departing from the principles and spirit of the invention, the scope of which is defined by the claims and their equivalents.

What is claimed is:

1. A method of outputting a telephone voice used in an earphone electrically connected to a near-end phone, wherein the method comprises: when the earphone does not use the near-end phone for phone communication, receiving a near-end input voice signal via a microphone module; modifying the near-end input voice signal with a frequency lowering process via a sound processing module so as to generate a first output voice signal; and outputting the first output voice signal via a speaker module;

wherein when the earphone using the near-end phone for phone communication, receiving a far-end input voice signal via a communication module, wherein the far-end input voice is transmitted by the near-end phone; receiving the near-end input voice signal via the microphone module; modifying the near-end input voice signal and the far-end input voice signal with the frequency lowering process via a sound processing module so as to generate a first output voice signal and a second output voice signal; outputting the near-end input voice signal to the near-end phone via the communication module; and outputting the first output voice signal and the second output voice signal via the speaker module; and wherein when the earphone uses the near-end phone for phone communication, the near-end input voice signal is modified with a volume decreasing process before the near-end input voice signal and the far-end input voice signal are modified with the frequency lowering process via the sound processing module.

2. The method of outputting telephone voice as claimed in claim 1, wherein the communication module is a Bluetooth communication module.

3. A earphone is electrically connected to a near-end phone, the earphone comprising: a sound processing module; a microphone module electrically connected to the sound processing module and used to receive a near-end input voice signal; a speaker module electrically connected to the sound processing module; a communication module electrically connected to the sound processing module; wherein when the earphone does not use the near-end phone for phone communication, the sound processing module modifies the near-end input voice signal with a frequency lowering process so as to generate a first output voice signal and the speaker module outputs the first output voice signal;

wherein when the earphone uses the near-end phone for phone communication, the communication module receives a far-end input voice signal transmitted from the near-end phone; the microphone module receives the near-end input voice signal; the sound processing module modifies the near-end input voice signal and the far-end input voice signal with a frequency lowering process so as to generate a first output voice signal and a second output voice signal; the communication module outputs the near-end input voice signal to the near-end phone; and the speaker module outputs the first output voice signal and the second output voice signal; and an adjustment module, wherein when the earphone uses the near-end phone for phone communication, the near-end input voice signal is modified with a volume decreasing process before the near-end input voice signal and the far-end input voice signal are modified with the frequency lowering process via the sound processing module.

4. The earphone as claimed in claim 3, wherein the communication module is a Bluetooth communication module.

* * * * *